(12) United States Patent
Hierstetter et al.

(10) Patent No.: US 8,158,707 B2
(45) Date of Patent: Apr. 17, 2012

(54) CONTINUOUS PROCESS FOR THE PRODUCTION OF ORGANOPOLYSILOXANE COMPOSITIONS

(75) Inventors: Thomas Hierstetter, Burghausen (DE); Johann Schuster, Emmerting (DE); Richard Birneder, Simbach (DE)

(73) Assignee: Wacker Chemie AG, Munich (DE)

( * ) Notice: Subject to any disclaimer, the term of this patent is extended or adjusted under 35 U.S.C. 154(b) by 229 days.

(21) Appl. No.: 12/640,283

(22) Filed: Dec. 17, 2009

(65) Prior Publication Data
US 2010/0160493 A1    Jun. 24, 2010

(30) Foreign Application Priority Data

Dec. 19, 2008    (DE) .......................... 10 2008 055 041

(51) Int. Cl.
*B29B 7/48* (2006.01)
(52) U.S. Cl. ........................................ 524/492; 524/588
(58) Field of Classification Search .................. 524/588, 524/492
See application file for complete search history.

(56) References Cited

U.S. PATENT DOCUMENTS

| 3,070,567 | A | * | 12/1962 | Nitzsche et al. | ............... | 524/860 |
| 4,737,561 | A | * | 4/1988 | Stary et al. | ....................... | 528/14 |
| 5,057,151 | A | | 10/1991 | Schuster et al. | | |
| 5,854,343 | A | | 12/1998 | Schuster et al. | | |
| 2004/0192809 | A1 | * | 9/2004 | Heisler et al. | ................. | 523/348 |

FOREIGN PATENT DOCUMENTS

EP    0807509 A1    11/1997

* cited by examiner

*Primary Examiner* — Margaret Moore
(74) *Attorney, Agent, or Firm* — Brooks Kushman P.C.

(57) ABSTRACT

Base compositions for silicone compositions with viscosity <500,000 mPas are continuously produced by, in a first stage, homogeneously mixing and kneading organopolysiloxanes (A) and prehydrophobized oxidic reinforcing fillers (B) in a continuous kneading cascade with kneading chambers arranged alongside one another, and in a second downstream stage, the compositions produced in the first stage of the process are subjected to aftertreatment in a mixing apparatus where the compositions have been subjected to a mixing procedure with introduction of shear force.

16 Claims, 1 Drawing Sheet

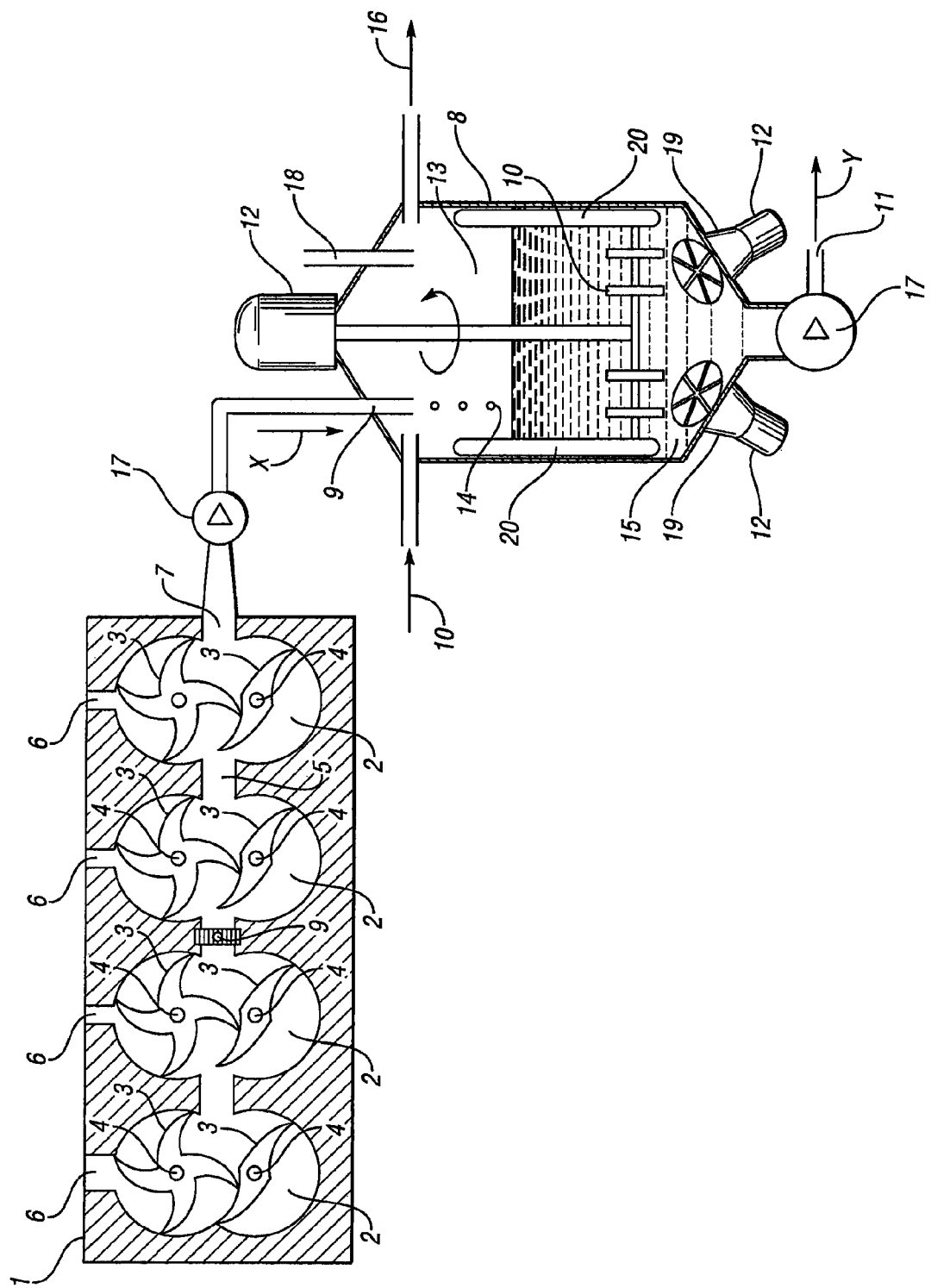

CONTINUOUS PROCESS FOR THE PRODUCTION OF ORGANOPOLYSILOXANE COMPOSITIONS

CROSS-REFERENCE TO RELATED APPLICATIONS

This application claims priority to German Application No. 10 2008 055 041.8 filed Dec. 19, 2008, which is herein incorporated by reference.

BACKGROUND OF THE INVENTION

1. Field of the Invention

The present invention relates to a continuous process for the production of base compositions for addition-crosslinking or condensation-crosslinking silicone compositions which have improved stability in relation to viscosity increase, SiH degradation, change of reactivity, and also additive degradation after storage.

2. Background Art

Those skilled in the art of the silicone elastomers are aware that silicone compositions comprising filler, for example RTV-2 (Room-Temperature-Vulcanizing 2-component) silicone rubbers, are mainly composed of base compositions. For the production of RTV-2 silicone rubbers, base compositions are mixed homogeneously with a vulcanizing agent, and also with other typical constituents of addition-crosslinking or condensation-crosslinking silicone compositions, which serve to establish certain final properties of the silicone elastomers obtained after the vulcanization process.

Methods based on the prior art for the production of base compositions either use prehydrophobized fillers, which are homogeneously mixed and kneaded together with appropriate organopolysiloxanes, or, in another approach, produce base compositions by using hydrophilic fillers, which are hydrophobized in situ by using suitable treatment agents during what is known as the compounding procedure. In both instances, the incorporation procedure can take place by way of a continuous or batch production process. Features of the batch processes, and in particular here of the in-situ process, are a disadvantageous space-time yield, high energy consumption, and the need to use inert gas because of the risk of formation of explosive mixtures, and these processes moreover have very high capital investment costs and labor costs. Kneaders operating batchwise can produce silicone compositions with high storage stability from base compositions composed of organopolysiloxanes and of prehydrophobized oxidic reinforcing fillers, and the silicone elastomers produced from those base compositions feature a very balanced mechanical property profile.

There are numerous known prior-art technologies for producing silicone compositions by way of a continuous process. The steps in the continuous process can be related either to the continuous production of base compositions or else to the continuous production of finished silicone compositions, the latter being composed of one or more components in most cases.

Silicone compositions which are composed of continuously produced base compositions which use prehydrophobized fillers generally have lower stability when compared with silicone compositions comprising base compositions produced batchwise. The reduced stability of the silicone compositions produced by prior art methods from continuously produced base compositions can become apparent, for example, as an increase in the viscosity of the silicone compositions after storage, which occurs particularly at elevated temperatures, for example during transport of the silicone compositions.

Because the residence time of the organopolysiloxanes and the filler is comparatively low in continuous processes for the production of base compositions, this can also lead to inadequate deactivation of the surface of the filler, with the resultant possibility of undesired reactions in the finished silicone composition. Furthermore, an inadequately deactivated filler surface can lead, in self-adhesive silicone compositions, to undesired reactions of reactive groups at the surface of the filler with additives such as adhesion promoters, with the inevitable result of impaired adhesion properties.

EP 0 807 509 A1 discloses the continuous production of storage-stable addition-crosslinking liquid silicone rubbers by using a specific kneading cascade. A simple devolatizing container is used for devolatization of the base compositions produced by the kneading machine. Although the silicone compositions produced from these base compositions feature good stability with respect to viscosity increase on storage, a substantial disadvantage of the process is that it is only capable of continuous production of storage-stable base compositions in the viscosity range above 500,000 mPas. This process cannot provide stability in the production of organopolysiloxane compositions with viscosity below 500,000 mPas. A further disadvantage of the process described in EP 0 807 509 A1 is that the continuous process can achieve volume flow rates of at most 300 kg/h. At any higher throughput, marked impairment of the stability of the base compositions can be observed.

SUMMARY OF THE INVENTION

It is therefore an object of the present invention to improve upon the prior art and to provide a continuous process for the production of base compositions with viscosities below 500,000 mPas, composed of prehydrophobized oxidic reinforcing fillers and of organopolysiloxanes. The resultant organosilicone compositions are moreover intended to meet the following requirements:

- high stability with respect to viscosity increase on storage, in particular at elevated temperatures,
- high stability with respect to loss of reactivity, i.e. zero or very little change in crosslinking characteristic on storage,
- high stability with respect to undesired reactions with additives, such as adhesion promoters or stabilizers,
- good demoldability, in particular from metallic vulcanization molds, immediately after the vulcanization process,
- high level of service properties, e.g. mechanical property profile, particular examples being tear-propagation resistance, ultimate tensile strength, elongation at break, and transparency.

BRIEF DESCRIPTION OF THE DRAWINGS

FIG. 1 illustrates one embodiment of the process of the invention employing a kneading cascade followed by a mixing vessel.

DETAILED DESCRIPTION OF THE PREFERRED EMBODIMENT(S)

The invention therefore provides a process for the production of base compositions with a viscosity <500,000 mPas, measured at 25° C. using a shear rate of $1\ s^{-1}$, by, in a first stage of the process, homogeneously mixing and kneading the following with one another:

at least one organopolysiloxane (A) selected from the group containing, per molecule, on average, at least 1.5 moieties having aliphatically unsaturated carbon-carbon multiple bonds, or hydroxy groups or hydrogen atoms, or a combination thereof and at least one prehydrophobized, or in-situ hydrophobized oxidic reinforcing filler (B), in a kneading cascade (1) with at least two kneading chambers (2) arranged alongside one another in series, each comprising, parallel to the axis, two kneading units (3) driven so as to corotate or counterrotate, and connected to other kneading chamber(s) via passage apertures (5) running perpendicularly with respect to the axes (4) of the kneading units (3), where at least the first kneading chamber has a supply aperture (6) and the last kneading chamber has a discharge aperture (7), and subjecting the resultant composition, in a second downstream stage of the process, to aftertreatment in a mixing apparatus (8), which has a supply aperture (9), by way of which the composition produced by way of the first stage of the process is introduced at a defined volume flow rate X to the mixing apparatus (8), subjected to shear force and devolatilized, with constant renewal of the surface (14), with use of rotating mixing units (10), or dispersing units (19), or scrapers (20), or a combination of these, and is discharged from the second stage of the process by way of a discharge aperture (11) at the volume flow rate Y.

In one preferred embodiment, the base compositions produced in the invention have viscosity <400,000 mPas, more preferably <300,000 mPas, measured at 25° C. using a shear rate of 1 s$^{-1}$.

In one preferred embodiment, (A) corresponds to linear or branched organopolysiloxanes composed of units of the general formula (I)

$$R^1_a R^2_b SiO_{(4-a-b)/2} \qquad (I)$$

where $R^1$ are monovalent $C_1$-$C_{10}$-hydrocarbon moieties free from aliphatic carbon-carbon multiple bonds and optionally substituted with halogen atoms, $R^2$ are hydrogen atoms, hydroxy groups, or monovalent $C_{2-8}$ hydrocarbon moieties having an aliphatic carbon-carbon multiple bond, a is 0, 1, 2, or 3, and b is 0, 1, or 2.

The average viscosity of the organopolysiloxanes (A) is preferably at least 10 mPas, in particular at least 100 mPas, and preferably at most $10^6$ mPas, and in particular at most $10^5$ mPas, at 25° C.

Examples of unsubstituted hydrocarbon radicals $R^1$ are the methyl, ethyl, n-propyl, isopropyl, n-butyl, isobutyl, tert butyl, n-pentyl, isopentyl, neopentyl, and tert-pentyl radicals; hexyl radicals such as the n-hexyl and cyclohexyl radicals; heptyl radicals such as the n-heptyl radical; octyl radicals such as the n-octyl radical, and isooctyl radicals such as the 2,2,4-trimethylpentyl radical; nonyl radicals such as the n-nonyl radical; decyl radicals such as the n-decyl radical; cycloalkyl radicals such as the cyclohexyl radical. Examples of hydrocarbon radicals $R^1$ substituted with halogen atoms are the 3,3,3-trifluoro-n-propyl radical, the 2,2,2,2',2',2'-hexafluoroisopropyl radical, the heptafluoroisopropyl radical, the 3-chloro-n-propyl radical, the 2-ethylbromide radical, and the 3-propylbromide radical. $R^1$ are preferably $C_1$-$C_6$-hydrocarbon radicals, in particular, the methyl, ethyl, and phenyl radicals.

Examples of monovalent $C_{2-8}$ hydrocarbon radicals $R^2$ having an aliphatic carbon-carbon multiple bond are alkenyl radicals such as the vinyl, 5-hexenyl, 1-propenyl, allyl, 1-butenyl, and 1-pentenyl radicals; and alkynyl radicals such as the ethynyl, propargyl, and 1-propynyl radicals.

It is preferable that the organopolysiloxanes (A) have at least 90, in particular at least 95, mol % of units of the general formula (I) in which the sum a+b=2, and it is also preferable that the organopolysiloxanes (A) have at least 60 mol %, more preferably at least 80 mol %, and most preferably 95 mol % of units of the general formula (I) in which b is 0.

The organopolysiloxane (A) of the general formula (I) can be an organopolysiloxane having a monomodal or multimodal molecular weight distribution, or a mixture composed of various organopolysiloxanes with monomodal or multimodal molecular weight distributions.

The organopolysiloxane (A) of the general formula (I) preferably has from 1 to 15, more preferably from 1 to 10, and in particular from 1 to 4 moieties $R^2$.

Examples of the organopolysiloxane (A) of the general formula (I) are linear, branched, and cyclic organopolysiloxanes composed of units of the formulae $(CH_3)_3SiO_{1/2}$, $(H_2C=CH)(CH_3)_2SiO_{1/2}$, $(CH_3)_2SiO_{2/2}$, $(H_2C=CH)(CH_3)SiO_{2/2}$, $(H)(CH_3)_2SiO_{1/2}$, $(H)(CH_3)SiO_{2/2}$, $(HO)(CH_3)_2SiO_{1/2}$, $(HO)(CH_3)SiO_{2/2}$, or of a mixture thereof.

Preferred embodiments of the organopolysiloxanes (A) having aliphatic carbon-carbon multiple bonds are:

copolymers containing $(H_2C=CH)(CH_3)SiO_{2/2}$ and $(CH_3)_2SiO_{2/2}$ units, having $(CH_3)_3SiO_{1/2}$ end groups; copolymers containing $(CH_3)_2SiO_{2/2}$ units, having $(H_2C=CH)(CH_3)_2SiO_{1/2}$ end groups; copolymers containing $(H_2C=CH)(CH_3)SiO_{2/2}$ and $(CH_3)_2SiO_{2/2}$ units, having $(H_2C=CH)(CH_3)_2SiO_{1/2}$ end groups; copolymers containing $(CH_3)_2SiO_{2/2}$ units, having $(CH_3)_3SiO_{1/2}$ end groups; copolymers containing $(Ph)_2SiO_{2/2}$ and $(H_2C=CH)(CH_3)SiO_{2/2}$ units, having $(CH_3)_3SiO_{1/2}$ end groups; copolymers containing $(Ph)_2SiO_{2/2}$, $(CH_3)_2SiO_{2/2}$ and $(H_2C=CH)(CH_3)SiO_{2/2}$ units, having $(CH_3)_3SiO_{1/2}$ end groups; copolymers containing $(Ph)_2SiO_{2/2}$ and $(H_2C=CH)(CH_3)SiO_{2/2}$ units, having $(H_2C=CH)(CH_3)_2SiO_{1/2}$ end groups; copolymers containing $(Ph)_2SiO_{2/2}$, $(CH_3)_2SiO_{2/2}$ and $(H_2C=CH)(CH_3)SiO_{2/2}$ units, having $(H_2C=CH)(CH_3)_2SiO_{1/2}$ end groups; copolymers containing $(Ph)(CH_3)SiO_{2/2}$, $(CH_3)_2SiO_{2/2}$ and $(H_2C=CH)(CH_3)Si_{2/2}$ units having $(CH_3)_3SiO_{1/2}$ end groups; copolymers containing $(Ph)(CH_3)SiO_{2/2}$, $(CH_3)_2SiO_{2/2}$ and $(H_2C=CH)(CH_3)Si_{2/2}$ units having $(H_2C=CH)(CH_3)_2SiO_{1/2}$ end groups; copolymers containing $(Ph)(CH_3)SiO_{2/2}$ and $(H_2C=CH)(CH_3)Si_{2/2}$ units, having $(CH_3)_3SiO_{1/2}$ end groups.

Particularly preferred embodiments of the organopolysiloxanes (A) having aliphatic carbon-carbon multiple bonds are copolymers containing $(H_2C=CH)(CH_3)SiO_{2/2}$ and $(CH_3)_2SiO_{2/2}$ units, having $(CH_3)_3SiO_{1/2}$ end groups; copolymers containing $(CH_3)_2SiO_{2/2}$ units, having $(H_2C=CH)(CH_3)_2SiO_{1/2}$ end groups; copolymers containing $(H_2C=CH)(CH_3)SiO_{2/2}$ and $(CH_3)_2SiO_{2/2}$ units, having $(H_2C=CH)(CH_3)_2SiO_{1/2}$ end groups; and copolymers containing $(CH_3)_2SiO_{2/2}$ units, having $(CH_3)_3SiO_{1/2}$ end groups.

The abovementioned examples of the organopolysiloxanes (A) having aliphatic carbon-carbon multiple bonds apply analogously to organopolysiloxanes (A) where $R^2$ is a hydrogen atom or hydroxy group. The $(H_2C=CH)$ group here is replaced by —OH or —H.

In other embodiments there are also possible copolymers which contain organopolysiloxanes (A) from a combination of the abovementioned examples, where $R^2=(H_2C=CH)$—, or —OH, or —H.

The reinforcing fillers (B) are preferably prehydrophobized. Each of the prehydrophobized reinforcing fillers (B) is preferably an oxidic prehydrophobized pulverulent filler, examples being fumed silica, precipitated silica, and silicon-aluminum mixed oxides, or fibrous fillers, such as asbestos. It is possible to use one type of filler and it is also possible to use a mixture of at least two fillers. The carbon content of the fillers (B), gained via the hydrophobization process, is preferably at least 0.5% by weight and preferably at most 6% by weight. When the carbon content of the fillers is determined, a drying process for at least 2 hours at ≧200° C. is used to ensure that the carbon content measured relates to the hydrophobizing layer of the fillers (B).

Particularly preferred reinforcing fillers (B) are fumed silica and precipitated silica. The BET surface area of the fillers (B) is preferably at least 50 m²/g, more preferably at least 80 m²/g, most preferably at least 120 m²/g.

The fillers (B) are hydrophobized by treatment with, for example, organosilanes, -silazanes, or -siloxanes, or by etherification of hydroxy groups to give alkoxy groups. U.S. Pat. No. 5,057,151 describes a preferred process for hydrophobization.

It is preferable to use at least 5 parts by weight, preferably at least 10 parts by weight, and in particular at least 20 parts by weight, and at most 200 parts by weight, preferably at most 150 parts by weight, and in particular at most 100 parts by weight of reinforcing fillers (B) per 100 parts by weight of the organopolysiloxanes (A).

In another embodiment, from 0.01% by weight to 2.0% by weight, preferably from 0.03% by weight to 1.5% by weight, and more preferably from 0.05% by weight to 1.0% by weight of water can be added during the first step of the process.

Further additives (H) are optionally present in amounts of up to 70% by weight, preferably from 0.0001 to 40% by weight in the base compositions produced by the process of the invention. These additives (H) can be added in the first stage of the process, in the second stage of the process, or prior to or after the process of the invention. The additives can, by way of example, be stabilizers, pigments, additives which facilitate processing or the wetting of the filler used with the organopolysiloxane, or additives which serve to adjust particular final properties of the silicone elastomers obtained after vulcanization. The additives can also, by way of example, be inert fillers such as quartz or talc, resinous polyorganosiloxanes, dispersing agents, solvents, adhesion promoters, pigments, dyes, plasticizers, organic polymers, heat stabilizers, etc. Among these are additives such as activated charcoal, powdered quartz, diatomaceous earth, clays, chalk, lithopones, carbon blacks, graphite, metal oxides, metal carbonates, metal sulfates, metal salts of carboxylic acids, metal dusts, fibers such as glass fibers, synthetic fibers, plastics powders, dyes, pigments, etc.

The base compositions produced by the process of the invention are preferably used for producing RTV-2 silicone rubbers.

It has been surprisingly discovered that by virtue of the 2-stage process described in the invention, the first stage of which corresponds to the previously known process of EP 0 807 509 A1 and the second stage of which corresponds to a continuous aftertreatment by way of the mixing apparatus (8) later described which further treats the compositions obtained from the first stage, silicone compositions and base compositions are produced which have the following advantages:
  improved stability with respect to viscosity increase on storage, in particular at elevated temperatures,
  improved stability with respect to loss of reactivity, i.e. very little change in crosslinking behavior on storage,
  improved stability with respect to undesired reactions with additives, such as adhesion promoters or stabilizers.

The silicone elastomers produced from the silicone compositions of the invention via crosslinking moreover have good demoldability immediately after the vulcanization process, in particular from metallic vulcanization molds, and exhibit a high level of service properties such as transparency, and a high mechanical property profile, for example in particular tear-propagation resistance, ultimate tensile strength, and elongation at break.

In one preferred embodiment, the first stage of the process has additionally been equipped with at least one devolatilization apparatus where a vacuum is applied, for example a devolatilization dome. In one particularly preferred embodiment, the vacuum is applied in the viscous phase.

In one preferred embodiment of the process of the invention, the average residence time of the base composition is longer in the second stage of the process than in the first stage of the process.

The residence time of the base composition produced in the second stage of the process is defined as the quotient obtained by dividing the system volume occupied by the base composition by the volume flow rate Y discharged. The residence time is in the range from 0.1 to 15 h, preferably from 0.1 to 10 h, and most preferably from 0.1 to 5 h.

The second stage of the process provides a continuously operating mixing apparatus (8), which preferably comprises mixing elements (10) or dispersing elements (19), or scrapers (20). In one particularly preferred embodiment, the mixing apparatus (8) in the second stage of the process comprises not only mixing elements (10) but also dispersing elements (19) and scrapers (20). As a function of the design of the system, i.e. depending on adjustment of the volume that the base composition occupies in the mixing apparatus (8) of the second stage of the process during continuous operation, and on the volume flow rates X and Y, the continuously operating mixing apparatus (8) can be used to set various residence times.

In one preferred embodiment, the mixing apparatus (8) of the second stage of the process is operated in such a way that there is an adequately large gas space (13) adjacent to the base composition within the mixing apparatus. In one particularly preferred embodiment, the mixing apparatus (8) of the second stage of the process is operated in such a way that, based on the total volume of the mixing apparatus (8), the amount of the base composition present is from 20 to 90%, in particular from 30 to 80% of the volume of the mixing unit.

In another preferred embodiment, in the second stage of the process, the compositions produced in the first stage are subjected to vacuum treatment at an elevated temperature. The elevated temperature is in the range from 80 to 250° C., preferably from 100 to 250° C., and most preferably from 120 to 230° C. The pressure is in the range from 0.1 to 900 mbar, preferably from 1 to 300 mbar, and most preferably from 1 to 150 mbar.

In another preferred embodiment of the process of the invention, the surface-area-to-volume ratio is greater in the second stage of the process than in the first stage of the process.

In the present invention, the surface area to volume ratio is the ratio of surface area (14) of the base composition which is adjacent to a vacuum (13) or to a gas space (13), to the volume (15) occupied by the base composition in the mixing apparatus (8). The surface-area-to-volume ratio here should be in the range from 0.1 to 10, preferably from 0.25 to 10, and more preferably from 0.5 to 8.

In another preferred embodiment of the process of the invention, mixing units (10) used in the second stage of the process are selected from planetary-gear or double-planetary-gear mixing units, crossblade mixing units, helical mixing units, propeller mixing units, and plowshare units, in each case, with or without scrapers (20). Examples of dispersing units (19) are dissolver disks, knife-head units, and also all of the homogenizers that use the rotor/stator principle. It is also possible here to use a combination of the units (10), (19), and (20) described herein. It is most preferable that the second stage of the process uses mixing units (10) and dispersing units (19) with scraper (20) which have been selected from planetary-gear or double-planetary-gear mixing units, crossblade mixing units, plowshare units, dissolver disks, knife-head units, and all of the homogenizers that use the rotor/stator principle, and scrapers, or a combination thereof.

In another preferred embodiment of the process of the invention, the second stage of the process uses a plurality of mixing units (10) and/or dispersing units (19), where these are driven by way of drive apparatuses (12) operating independently of one another. The mixing units (10) and/or dispersing units (19) here can be driven so as to corotate or counterrotate.

In one preferred embodiment, the second stage of the process is equipped with a heating/cooling apparatus which can control the temperature of the composition to a temperature of up to 250° C., preferably 200° C. By way of example, this can be achieved by way of at least one heating/cooling jacket mounted on the outer wall of the mixing apparatus.

In one embodiment of the process of the invention, the volume flow rate X in the mixing apparatus (8) of the second stage of the process is adjusted so that the ratio to the volume flow rate Y is in the range from 0.5 to 1.5.

In another preferred embodiment of the invention, the devolatilization of the composition in the mixing apparatus (8) of the second stage of the process takes place by means of a continuous or non-continuous stream of gas (16) in the vacuum (13), where the gas introduced into the mixing apparatus is known as an entrainer gas and is used to improve removal of volatile constituents. In one particularly preferred embodiment, inert gases are used as entrainer gas, in particular nitrogen.

In one preferred embodiment, there is a direct connection between the first stage of the process and the second stage of the process. This is preferably achieved in that the composition produced in the first stage of the process has a direct connection by way of a pipe system to the second stage of the process, if appropriate with the aid of a conveyor apparatus (17), for example a pump. This provides fully continuous production of base compositions by the process of the invention.

In the invention, the second stage used in the process is controlled in continuous operation in such a way that there is always an adequate amount of composition in the mixing apparatus (8). This is primarily achieved by way of the adjustment of the volume flow rates X and Y. The input shear force and the intensity of mixing can also be adjusted as desired by controlling the rotation rate and the direction of rotation of the mixing units (10) and/or dispersing units (19). In one preferred embodiment, the rotation rates of the mixing units (10), inclusive of scrapers (20), are in the range from 0.1 to 200 $s^{-1}$, more preferably in the range from 1 to 150 $s^{-1}$. This corresponds to a peripheral velocity of from 0.1 to 20 m/s, preferably from 0.5 to 10 m/s. In another preferred embodiment, the rotation rate(s) of the dispersing unit/homogenizer(s) (19) is/are in the range from 50 to 5000 $s^{-1}$, more preferably in the range from 200 to 4000 $s^{-1}$, corresponding to a peripheral velocity of from 1 to 100 m/s, preferably from 4 to 80 m/s.

In one preferred embodiment of the second stage of the process, the design of the mixing units (10) and/or dispersing units (19) is such that the base composition is conveyed to the discharge aperture (11). It can also be conveyed to the discharge aperture with the aid of a conveyor apparatus (17), for example with the aid of a pump. The conveyor apparatus can also be a homogenizer which has conveyor action and which by way of example operates by the rotor/stator principle.

Within the mixing apparatus (8) of the second stage of the process, it is preferable that, alongside the supply aperture (9) for the base composition from the first stage of the process, there are further supply apertures (18) present, which permit continuous introduction of, for example, processing aids, or further organopolysiloxanes, or additives.

The mixing apparatus (8) can also preferably comprise a bypass circuit which permits return to the mixing apparatus (8), and retreatment, of any desired ratio from 0 to 1 of the volume flow rate Y that is to be discharged.

FIG. 1 shows one of the many possible embodiments of the first and second stages of the process, in the form of a sectional drawing. Identical elements are indicated by identical numerals in FIG. 1. The kneading cascade (1) in FIG. 1 has four kneading chambers (2) arranged alongside one another in series. FIG. 1 represents only one possible embodiment of the apparatus that can be used for the process of the invention, and does not limit the process to this apparatus.

The supply apertures (6) can lead directly into kneading chambers (2), or can be located between two kneading chambers (2).

In one preferred embodiment of the kneading cascade (1) of the first stage of the process of the invention, the last kneading chamber has pump vanes to improve product discharge. The feed of the starting materials and their incorporation by mixing, for example of the organopolysiloxanes (A), of the fillers (B), and, if appropriate, of further additives into the base composition can take place in any desired sequence. It is also possible that the feed of, for example, the fillers (B) takes place in one or more kneading chambers (2) of the kneading cascade (1). The feed of the organopolysiloxanes (A) can take place either in the first kneading chamber (2) or else at least in portions, in one or more downstream kneading chambers (2), in order by way of example to reduce the viscosity of the composition. The required fillers (B) can be fed into all of the kneading chambers (2), but it is preferable that no filler (B) is fed into the last chamber (2). It is possible to add the entire required amount of filler only in, for example, one/two/three, or four, of the first chambers (2), however, it is also possible to distribute portions of the filler over all of these.

The mixing apparatus (8) which is part of the second stage of the process and which has been sketched as one embodiment in FIG. 1 is composed of a preferably metallic container, which has a supply aperture (9), by way of which the composition from the first stage of the process is introduced at a volume flow rate X. The mixing units (10) and/or dispersing units (19) can optionally also be supplemented by scrapers (20). They are rotated with the aid of drive apparatuses (12), for example an electric motor, or by means of a hydraulic assembly, and optionally can be controlled independently of one another by way of a torque regulator. The mixing apparatus (8) has a gas inlet and gas outlet (16) and it is preferable that an entrainer gas is introduced here by way of the gas inlet and that a vacuum is applied at the gas outlet. The base composition is discharged at a volume flow rate Y by way of the discharge aperture (11) of the second stage of the process.

The mixing apparatus (8) may be designed as a vertical mixer or as a horizontal mixer.

EXAMPLES

The examples below illustrate the invention but have no restricting effect. Unless otherwise stated, all of the quantitative and percentage data in the examples are based on weight and all of the pressures are 0.10 MPa (abs.).

Examples of the invention are given below relating to the continuous production of low-viscosity organopolysiloxane base compositions by the process of the invention, by analogy with the diagram of FIG. 1, taking the single-stage process as a comparison.

Comparative Example C1

Not of the Invention 25 kg/h of HDK® SKS 130 treated silica from Wacker Chemie AG are incorporated into 30 kg/h of α,ω-divinylorganopolysiloxane with a viscosity of about 1000 mPas in a continuous kneader, the temperature rising to 180° C. 20 kg/h of α,ω-divinylorganopolysiloxane with a viscosity of about 1000 mPas is used at the end of the kneader for dilution to the desired final viscosity. After cooling of the resultant organopolysiloxane base composition, a Brookfield viscometer is used to determine the viscosity at 23° C. No viscosity is measurable; the composition is non-flowable. Further processing to give a flowable finished composition is not possible.

Example 2

Of the Invention 25 kg/h of HDK® SKS 130 treated silica from Wacker Chemie AG are incorporated into 30 kg/h of α,ω-divinylorganopolysiloxane with a viscosity of about 1000 mPas in a continuous kneader, the temperature rising to 180° C. 20 kg/h of α,ω-divinylorganopolysiloxane with viscosity about 1000 mPas is used at the end of the kneader for dilution to the desired final viscosity. The stream of material is conducted onward to a continuous mixer, where it is mixed at 180° C. using a vacuum of 100 mbar abs. and subjected to shear from 2 dissolver disks at 1300 rpm. Material is continuously removed from the mixer so that the average residence time resulting from the throughput from stage 1 and the volume of stage 2 is 2 h. After cooling of the resultant organopolysiloxane base composition, a Brookfield viscometer is used to determine viscosity at 23° C. Viscosity is measurable, at 80,000 mPas, and the composition has very good flowability. Further processing to give a flowable finished composition is possible without difficulty.

Table 1 below shows the viscosity behavior of the composition from Example 2 in comparison with a reference without any second stage in the process (Comparative Example C1) after production, t=0 d (=days), and after a storage time of t=28 d.

TABLE 1

| Example | Viscosity [mPas] t = 0 d | Viscosity [mPas] t = 28 d | Difference [mPas] |
| --- | --- | --- | --- |
| C1 | non-flowable, not measurable | non-flowable, not measurable | — |
| 2 | 80,000 flowable | 95,000 flowable | 15,000 |

Comparative Example C3

Not of the Invention 25 kg/h of HDK® SKS 130 treated silica from Wacker Chemie AG are incorporated into 25 kg/h of α,ω-divinylorganopolysiloxane with a viscosity of about 1000 mPas in a continuous kneader, the temperature rising to 180° C. 25 kg/h of α,ω-dihydroorganopolysiloxane with viscosity about 1000 mPas is used at the end of the kneader for dilution to the desired final viscosity. After cooling of the resultant organopolysiloxane base composition, a Brookfield viscometer is used to determine viscosity at 23° C. No viscosity is measurable; the composition is non-flowable. Further processing to give a flowable finished composition is not possible.

Example 4

Of the Invention 25 kg/h of HDK® SKS 130 treated silica from Wacker Chemie AG are incorporated into 25 kg/h of α,ω-divinylorganopolysiloxane with a viscosity of about 1000 mPas in a continuous kneader, the temperature rising to 180° C. 25 kg/h of α,ω-dihydroorganopolysiloxane with viscosity about 1000 mPas is used at the end of the kneader for dilution to the desired final viscosity. The stream of material is conducted onward to a continuous mixer, where it is mixed at 180° C. using a vacuum of 100 mbar abs. and subjected to shear from 2 dissolver disks at 1300 rpm. Material is continuously removed so that the average residence time resulting from the throughput from stage 1 and the stage 2 volume is 2 h. After cooling of the resultant organopolysiloxane base composition, a Brookfield viscometer is used to determine viscosity at 23° C. Viscosity is measurable, at 50,000 mPas, and the composition has very good flowability. Further processing to give a flowable finished composition is possible without difficulty.

Table 2 below shows the viscosity behavior of the composition from Example 4 in comparison with a reference without any second stage in the process (Comparative Example C3) after production, t=0 d, and after a storage time of t=28 d.

TABLE 2

| Reference Example | Viscosity [mPas] t = 0 d | Viscosity [mPas] t = 28 d | Difference [mPas] |
| --- | --- | --- | --- |
| C3 | non-flowable, not measurable | non-flowable, not measurable | — |
| 4 | 50,000 flowable | 80,000 flowable | 30,000 |

Comparative Example C5

Not of the Invention 0.1 kg/h of deionized water and 25 kg/h of HDK® SKS 130 treated silica from Wacker Chemie AG are incorporated in a continuous kneader into 25 kg/h of α,ω-divinylorganopolysiloxane with a viscosity of about 1000 mPas, the temperature rising to 180° C. 25 kg/h of α,ω-dihydroorganopolysiloxane with a viscosity of about 1000 mPas are used at the end of the kneader for dilution to the desired final viscosity. After cooling of the resultant organopolysiloxane base composition, a Brookfield viscometer is used to determine viscosity at 23° C. No viscosity is measurable; the composition is non-flowable. Further processing to give a flowable finished composition is not possible.

Example 6

Of the Invention 0.1 kg/h of deionized water and 25 kg/h of HDK® SKS 130 treated silica from Wacker Chemie AG are incorporated into 25 kg/h of α,ω-divinylorganopolysiloxane with a viscosity of about 1000 mPas in a continuous kneader, the temperature rising to 180° C. 25 kg/h of α,ω-dihydroorganopolysiloxane with a viscosity of about 1000 mPas is used at the end of the kneader for dilution to the desired final viscosity. The stream of material is conducted onward to a continuous mixer, where it is mixed at 180° C. using a vacuum of 100 mbar abs. and subjected to shear from 2 dissolver disks at 1300 rpm. Material is continuously removed so that the average residence time resulting from the throughput from stage 1 and the stage 2 volume is 2 h. After cooling of the resultant organopolysiloxane base composition, a Brookfield viscometer is used to determine viscosity at 23° C. Viscosity is measurable, at 40,000 mPas, and the composition has very good flowability. Further processing to give a flowable finished composition is possible without difficulty.

Table 3 below shows the viscosity behavior of the composition from Example 6 in comparison with a reference without any second stage in the process (Comparative Example C5) after production, t=0 d, and after a storage time of t=28 d.

TABLE 3

| Reference Example | Viscosity [mPas] t = 0 d | Viscosity [mPas] t = 28 d | Difference [mPas] |
|---|---|---|---|
| C5 | non-flowable, not measurable | non-flowable, not measurable | — |
| 6 | 40,000 flowable | 45,000 flowable | 5000 |

Comparative Example C7

Not of the Invention 21 kg/h of HDK® SKS 130 treated silica from Wacker Chemie AG are incorporated into 35 kg/h of α,ω-dihydroxy-organopolysiloxane with a viscosity of about 20,000 mPas in a continuous kneader, the temperature rising to 160° C. 31 kg/h of α,ω-dihydroxy-organopolysiloxane with a viscosity of about 75,000 mPas and 7 kg/h of α,ω-dihydroxyorganopolysiloxane with a viscosity of about 20,000 mPas are used at the end of the kneader for dilution to the desired final viscosity. After cooling of the resultant organopolysiloxane base composition, a Brookfield viscometer is used to determine viscosity at 23° C. No viscosity is measurable; the composition is non-flowable. Further processing to give a flowable finished composition is not possible.

Example 8

Of the Invention 21 kg/h of HDK® SKS 130 treated silica from Wacker Chemie AG are incorporated into 35 kg/h of α,ω-dihydroxy-organopolysiloxane with a viscosity of about 20,000 mPas in a continuous kneader, the temperature rising to 160° C. 31 kg/h of α,ω-dihydroxyorganopolysiloxane with a viscosity of about 75,000 mPas and 7 kg/h of α,ω-dihydroxyorganopolysiloxane with a viscosity of about 20,000 mPas are used at the end of the kneader for dilution to the desired final viscosity. The stream of material is conducted onward to a continuous mixer, where it is mixed at 180° C. using a vacuum of 100 mbar abs. and subjected to shear from 2 dissolver disks at 1300 rpm. Material is continuously removed so that the average residence time resulting from the throughput from stage 1 and the stage 2 volume is 2 h. After cooling of the resultant organopolysiloxane base composition, a Brookfield viscometer is used to determine viscosity at 23° C. Viscosity is measurable, at 250,000 mPas, and the composition has very good flowability. Further processing to give a flowable finished composition is possible without difficulty.

Table 4 below shows the viscosity behavior of the composition from example 8 in comparison with a reference without any second stage in the process (Comparative Example C7) after production, t=0 d, and after a storage time of t=28 d.

TABLE 4

| Reference Example | Viscosity [mPas] t = 0 d | Viscosity [mPas] t = 28 d | Difference [mPas] |
|---|---|---|---|
| C7 | non-flowable, not measurable | non-flowable, not measurable | — |
| 8 | 250,000 flowable | 277,000 flowable | 27,000 |

From all of the stated examples it is seen that the two-stage process described in the invention for the first time permits continuous production of low-viscosity, storage-stable organopolysiloxane compositions for use in RTV-2 finished products.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the production of base compositions with a viscosity <400,000 mPas measured at 25° C. using a shear rate of 1 s$^{-1}$, by a) in a first stage, homogeneously mixing and kneading with one another:
at least one organopolysiloxane (A) containing, on average, per molecule, on average, at least 1.5 radicals having aliphatically unsaturated carbon-carbon multiple bonds, or hydroxy groups or hydrogen atoms, or a combination thereof
and
at least one prehydrophobized oxidic reinforcing filler (B) having at least 0.5% by weight carbon content gained via a hydrophobizing process, in a kneading cascade with at least two kneading chambers arranged alongside one another in series, each comprising, parallel to the axis, two kneading units driven so as to corotate or counter-rotate, and connected to other kneading chamber(s) via passage apertures running perpendicularly with respect to the axes of the kneading units, where at least the first kneading chamber has a supply aperture and the last kneading chamber has a discharge aperture, to form a kneaded product b) in a second downstream stage of the process, subjecting the kneaded product to aftertreatment in a mixing apparatus, which has a supply aperture, by way of which kneaded product is introduced at a volume flow rate X, subjected to shear force and devolatilized with constant renewal of the surface, with use of rotating mixing units, dispersing units, scrapers, or a combination thereof, and discharging a base composition from the second stage by way of a discharge aperture at a volume flow rate Y.

2. The process of claim 1, wherein the organopolysiloxane (A) comprises units of the formula (I)

where $R^1$ independently are monovalent $C_1$-$C_{10}$-hydrocarbon moieties free from aliphatic carbon-carbon multiple bonds, and optionally substituted with halogen atoms, $R^2$ independently are hydrogen atoms, hydroxy groups, or monovalent $C_{2-8}$ hydrocarbon moieties having an aliphatic carbon-carbon multiple bond, a is 0, 1, 2, or 3, and b is 0, 1, or 2.

3. The process of claim 2, wherein the average residence time of the base composition is longer in the second stage of the process than in the first stage of the process.

4. The process of claim 1, wherein the average residence time of the base composition is longer in the second stage of the process than in the first stage of the process.

5. The process of claim 1, wherein a ratio of surface area to volume is greater in the second stage of the process than in the first stage of the process.

6. The process of claim 1, wherein, in the second stage of the process, the kneaded product produced in the first stage of the process is subjected to vacuum treatment at a temperature of from 80 to 250° C.

7. The process of claim 1, wherein the residence time of the 2nd stage of the process is in the range from 0.1 to 15 h.

8. The process of claim 1, wherein the second stage of the process uses a combination of mixing unit, dispersing unit, and scraper.

9. The process of claim 1, wherein the mixing unit has an internal volume and wherein the content of the base composition in the mixing apparatus is from 20 to 90% of the internal volume of the mixing unit, leaving a gas space of from 80 to 10% of the internal volume.

10. The process of claim 1, wherein the mixing unit has an internal volume and wherein the content of the base composition in the mixing apparatus is from 30 to 80% of the internal volume of the mixing unit, leaving a gas space of from 70 to 20% of the internal volume.

11. The process of claim 1, wherein the mixing apparatus contains a scraper and at least one dispersing unit selected from the group consisting of planetary gear mixing units, crossblade mixing units, plowshare mixing units, dissolver disks, knife head disks, and rotor/stator homogenizers.

12. The process of claim 1, wherein the base composition viscosity is <300,000 mPa·s.

13. The process of claim 1, wherein the mixing apparatus is a vertical vessel having an internal volume and having a gas space at the top which occupies from 10% to 80% of the internal volume of the mixing apparatus, the mixing apparatus containing at least one scraper and at least one dispersing unit.

14. A process for the production of base compositions with a viscosity <500,000 mPas measured at 25° C. using shear rate of 1 s$^{-1}$, by a) in a first stage, homogeneously mixing and kneading with one another:

at least one organopolysiloxane (A) containing, on average, per molecule, on average, at least 1.5 radicals having aliphatically unsaturated carbon-carbon multiple bonds, or hydroxy groups or hydrogen atoms, or a combination thereof and at least one prehydrophobized oxidic reinforcing filler (B) having at least 0.5% by weight carbon content gained via a hydrophobizing process, in a kneading cascade with at least two kneading chambers arranged alongside one another in series, each comprising, parallel to the axis, two kneading units driven so as to corotate or counter-rotate, and connected to other kneading chamber(s) via passage apertures running perpendicularly with respect to the axes of the kneading units, where at least the first kneading chamber has a supply aperture and the last kneading chamber has a discharge aperture, to form a kneaded product b) in a second downstream stage of the process, subjecting the kneaded product to aftertreatment in a mixing apparatus, which has a supply aperture, by way of which kneaded product is introduced at a volume flow rate X, subjected to shear force and devolatilized with constant renewal of the surface, with use of rotating mixing units, dispersing units, scrapers, or a combination thereof, and discharging a base composition from the second stage by way of a discharge aperture at a volume flow rate Y, wherein amounts of from 0.01% by weight to 2.0% by weight of water are also added during the first stage of the process.

15. The process of claim 14, wherein the organopolysiloxane (A) comprises units of the formula (I)

where $R^1$ independently are monovalent $C_1$-$C_{10}$-hydrocarbon moieties free from aliphatic carbon-carbon multiple bonds, and optionally substituted with halogen atoms, $R^2$ independently are hydrogen atoms, hydroxy groups, or monovalent $C_{2-8}$ hydrocarbon moieties having an aliphatic carbon-carbon multiple bond, a is 0, 1, 2, or 3, and b is 0, 1, or 2.

16. The process of claim 14, wherein the average residence time of the base composition is longer in the second stage of the process than in the first stage of the process.

* * * * *